United States Patent
Jayakar et al.

(10) Patent No.: US 11,097,680 B2
(45) Date of Patent: Aug. 24, 2021

(54) FLOOR-MOUNTED OCCUPANT RESTRAINT SYSTEM

(71) Applicant: ZF Passive Safety Systems US Inc., Washington, MI (US)

(72) Inventors: Hylus Ranjit Raj Jayakar, Shelby Township, MI (US); Wael Youssef-Agha, Rochester Hills, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 26 days.

(21) Appl. No.: 16/540,093

(22) Filed: Aug. 14, 2019

(65) Prior Publication Data

US 2021/0046890 A1 Feb. 18, 2021

(51) Int. Cl.
*B60R 21/20* (2011.01)
*B60R 21/2338* (2011.01)
*B60R 21/231* (2011.01)
*B60R 21/16* (2006.01)

(52) U.S. Cl.
CPC .......... *B60R 21/20* (2013.01); *B60R 21/2338* (2013.01); *B60R 2021/161* (2013.01); *B60R 2021/23161* (2013.01)

(58) Field of Classification Search
CPC ............... B60R 21/20; B60R 21/2338; B60R 2021/23161; B60R 2021/161
See application file for complete search history.

(56) References Cited

U.S. PATENT DOCUMENTS

| 5,222,761 | A | * | 6/1993 | Kaji | B60R 21/017 |
| | | | | | 280/730.2 |
| 6,142,521 | A | * | 11/2000 | Shephard | B60R 19/00 |
| | | | | | 280/728.1 |
| 9,744,932 | B1 | | 8/2017 | Faruque et al. | |
| 10,023,145 | B1 | | 7/2018 | Rivera et al. | |
| 10,525,922 | B1 | * | 1/2020 | Lin | B60R 21/01516 |
| 2017/0217351 | A1 | * | 8/2017 | Jaradi | B60N 3/063 |
| 2018/0361981 | A1 | * | 12/2018 | Faruque | B60R 21/231 |
| 2019/0291680 | A1 | * | 9/2019 | Baccouche | B62D 21/15 |
| 2019/0315303 | A1 | * | 10/2019 | Kia | B60N 2/01 |
| 2020/0062210 | A1 | * | 2/2020 | Fukawatase | B60R 21/231 |

FOREIGN PATENT DOCUMENTS

WO WO-2019168883 A1 * 9/2019 ............. B60N 2/143

* cited by examiner

*Primary Examiner* — Darlene P Condra
(74) *Attorney, Agent, or Firm* — Tarolli, Sundheim, Covell & Tummino LLP

(57) ABSTRACT

A restraint system is provided for helping to protect at least one occupant of a vehicle having a floor and a cabin with at least one seat for receiving each occupant. The restraint system includes an airbag extending from a first end mounted in the vehicle floor to a second end. The airbag includes a first airbag portion curved away from the at least one occupant and a second airbag portion extending towards the at least one occupant. The airbag has a stored condition and is inflatable to a deployed condition aligned with the at least one occupant. A tether is connected to the airbag and the floor for limiting relative forward-rearward movement of the airbag in response to occupant penetration into the airbag.

18 Claims, 6 Drawing Sheets

FLOOR-MOUNTED OCCUPANT RESTRAINT SYSTEM

TECHNICAL FIELD

The present invention relates generally to vehicle airbags and, in particular, relates to floor-mounted airbags.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free to utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

According to one aspect, a restraint system is provided for helping to protect at least one occupant of a vehicle having a floor and a cabin with at least one seat for receiving each occupant. The restraint system includes an airbag extending from a first end mounted in the vehicle floor to a second end. The airbag includes a first airbag portion curved away from the at least one occupant and a second airbag portion extending towards the at least one occupant. The airbag has a stored condition and is inflatable to a deployed condition aligned with the at least one occupant. A tether is connected to the airbag and the floor for limiting relative forward-rearward movement of the airbag in response to occupant penetration into the airbag.

According to another aspect, a restraint system is provided for helping to protect at least one occupant of a vehicle having a floor and a cabin with at least one seat for receiving each occupant. The restraint system includes an airbag extending from a first end mounted in the vehicle floor to a second end. The airbag includes a first airbag portion curved away from the at least one occupant and a second airbag portion curved towards the at least one occupant. The first airbag portion is configured to be connected to the floor and positioned between the floor and the second airbag portion. The airbag has a stored condition and is inflatable to a deployed condition aligned with the at least one occupant. A tether is connected to the airbag and the floor for limiting relative forward-rearward movement of the airbag in response to occupant penetration into the airbag.

Other objects and advantages and a fuller understanding of the invention will be had from the following detailed description and the accompanying drawings.

DETAILED DESCRIPTION

Figure 1:
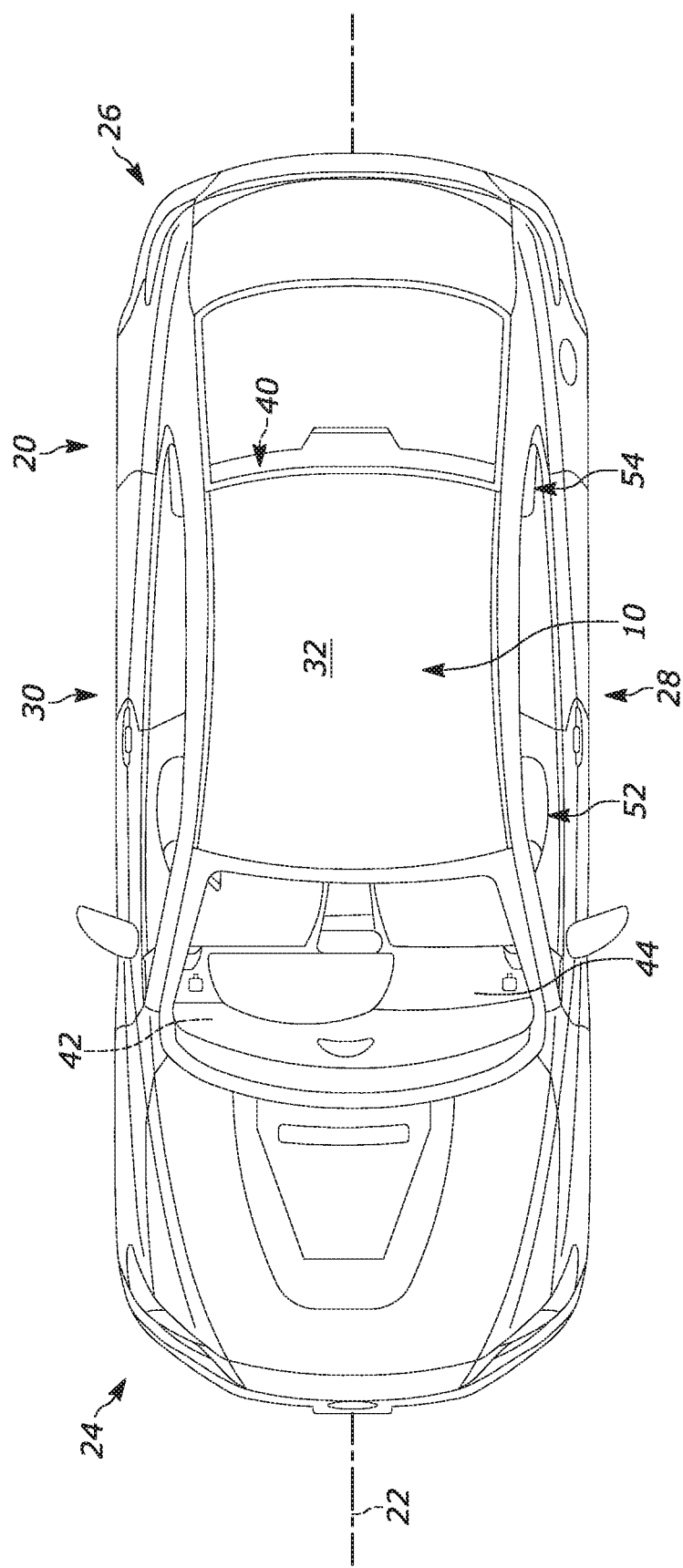
FIG. 1 is a top view of a vehicle including an example floor-mounted, occupant restraint system.
Figure 2:
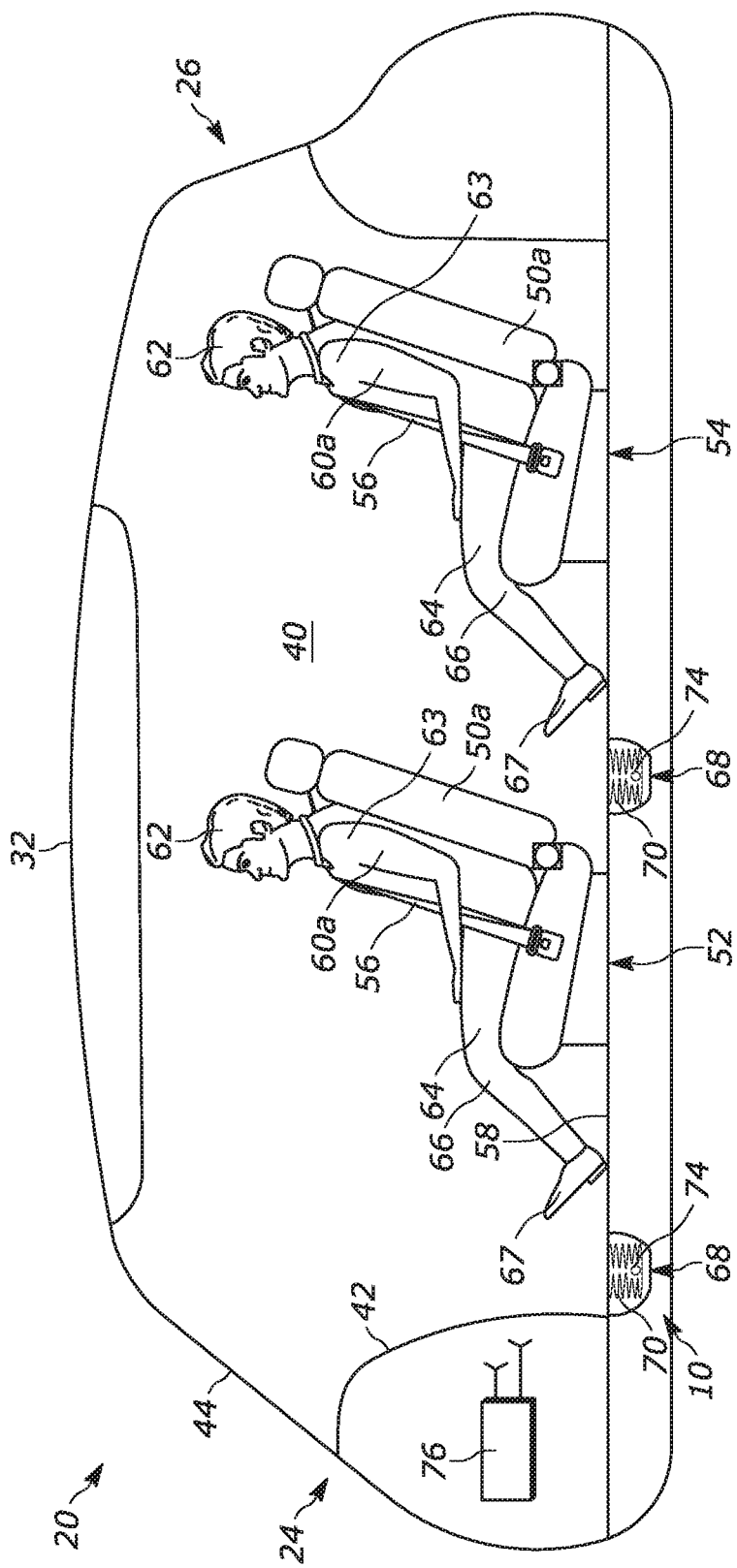
FIG. 2 is a schematic illustration of a cabin of the vehicle with a first seating arrangement and example airbags of the restraint system in a stored condition.

The present invention relates generally to vehicle airbags and, in particular, relates to floor-mounted airbags that include a tether. FIGS. 1-2 illustrate an example vehicle safety system in the form of an occupant restraint system 10. The vehicle 20 extends along a centerline 22 from a first or fore end 24 to a second or aft end 26. The vehicle 20 extends to a left side 28 and a right side 30 on opposite sides of the centerline 22. The first end 24 of the vehicle 20 includes an instrument panel 42 facing a passenger compartment or cabin 40. A windshield or windscreen 44 can be located between the instrument panel 42 and the roof 32.

The vehicle 20 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40.

Seats 50 are positioned in the cabin 40 and attached to a floor 58 of the vehicle 20. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be arranged in front and rear rows 52 and 54, respectively, oriented in a forward-facing manner similar to that of conventional automobiles. It will be appreciated that the vehicle 20 could alternatively include more or fewer rows of seats 50 (not shown). In the example shown, each row 52, 54 includes three seats, namely, a left side 26 seat 50a, a middle seat 50b, and a right side 30 seat 50c (see FIG. 4). Each seat 50a-50c receives an associated occupant 60a-60c and is fitted with a seatbelt 56 for restraining its occupant.

For the conventional, forward-facing seating arrangement of FIG. 2, in the event of a frontal crash, the occupants 60a-60c of both the front and rear rows 52, 54 are restrained by their respective seatbelts 56. Additional restraints are, however, desirable for head and neck support. This additional protection is typically provided, at least for the front row 52 occupants, by instrument panel mounted airbags. In the autonomous vehicle 20 of FIG. 2, however, the instrument panel can be reduced in size and/or removed altogether. Control interfaces for climate controls, GPS, navigation, entertainment, etc. can, for example, be provided in a center console area of the vehicle 20 located between the occupants 60a-60c of the front and/or rear rows 52, 54.

Figure 3:
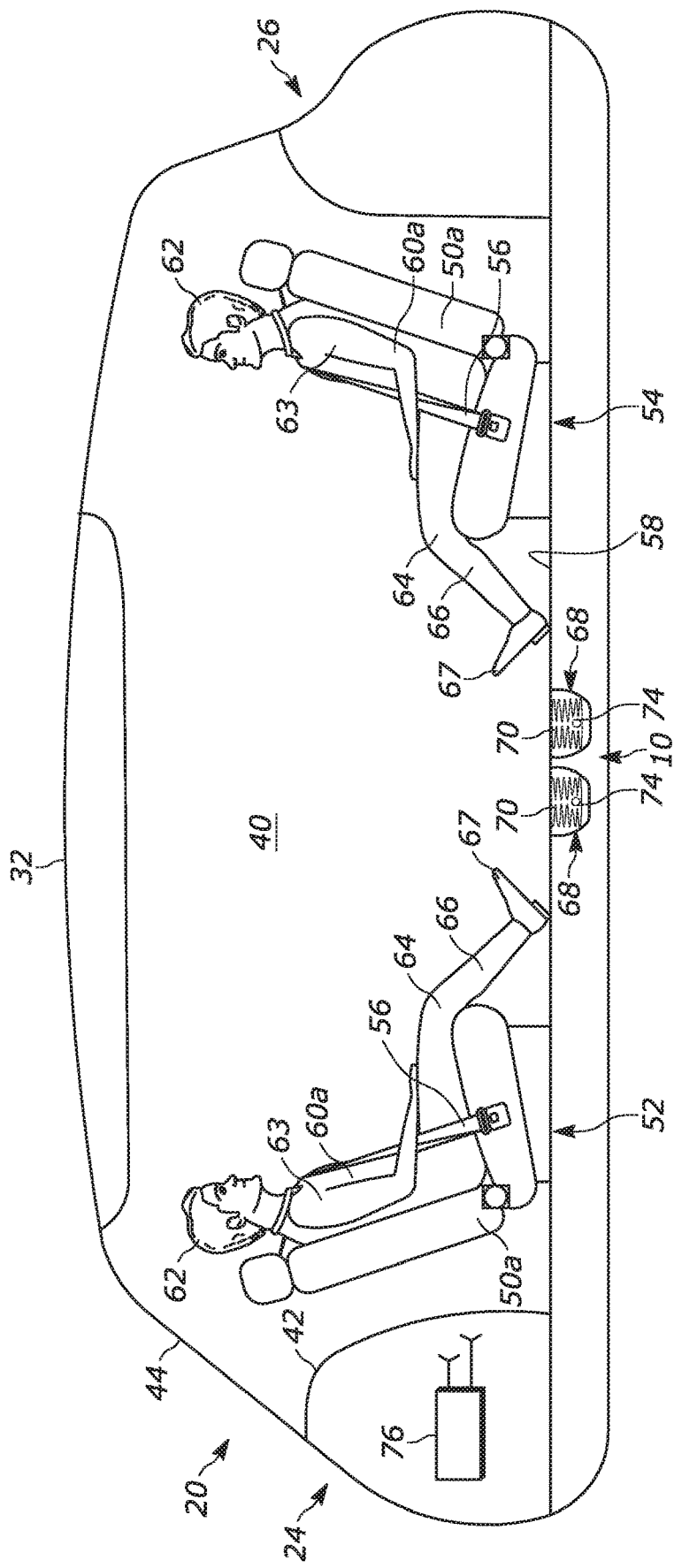
FIG. 3 is a schematic illustration of the cabin of the vehicle with a second seating arrangement and example airbags of the restraint system in a stored condition.
Figure 4:
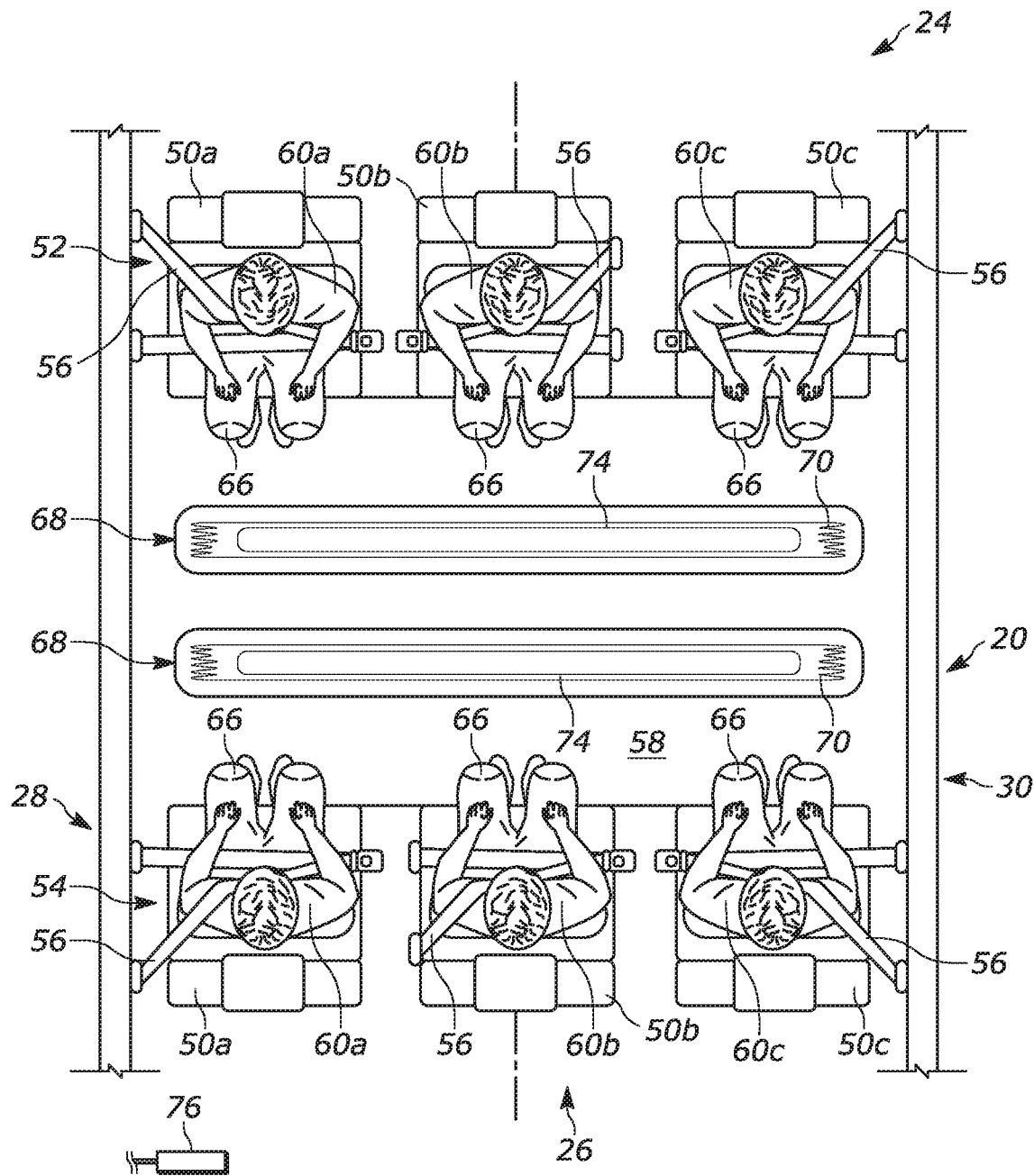
FIG. 4 is a top view of the cabin of FIG. 3.

In another seating arrangement shown in FIGS. 3-4, the vehicle 20 includes two rows of seats 50a-50c that face each other, with the front row 52 being rearward-facing and the rear row 54 being forward-facing. More or fewer rows of seats facing in either direction are also contemplated. For this unconventional, forward-rearward seating arrangement shown, in the event of a frontal crash, the occupants 60a-60c of the forward-facing rear row 54 are restrained by their respective seatbelts 56. Occupants 60a-60c of the rear-facing front row 52, while buckled, are supported in a frontal crash by the seatbacks of the vehicle seats 50a-50c. Because of this, the seats 50a-50c must be constructed to support the occupants 60a-60c in the event of a crash. For the forward-facing occupants 60a-60c in the rear row 54, the seatbelts 56 offer some degree of restraint. It is desirable, however, for both rows 52, 54 to include additional restraints for head and neck support.

In either seating arrangement, since the front row 52 need not be in close proximity to the instrument panel 42 or the area where an instrument panel would normally reside, there can be a large volume of space between the front row 52 and the forward cabin structure presented facing the front row. This affects the forward-rearward spacing between the front and rear rows 52, 54. Because of this, it may not be efficient to deploy airbags from these locations due to the large volume that the airbags would need to occupy. This would present problems in sizing the airbag(s) and inflator(s) to occupy that large volume and could also present problems in deploying the airbag(s) into that large volume in the necessary short time required to protect occupants in a crash scenario.

It is therefore evident that the various passenger seating configurations enabled by autonomous vehicles can present challenges to the conventional concepts of airbag protection. Furthermore, since airbags require structure supporting the deployed airbag against movement in response to occupant penetration (e.g., a reaction surface), the absence of typical vehicle architecture that acts as a reaction surface, such as an instrument panel, presents additional challenges.

To account for these challenges, the occupant restraint system 10 shown in FIGS. 1-4 includes vehicle occupant protection devices in the form of inflatable airbags 70 mounted in/on the floor 58 of the vehicle 20 and associated with each row 52, 54. Mounting the airbags 70 in the vehicle floor 58 is convenient because the airbags can be positioned in locations with a desired proximity to the occupants 60a-60c they are intended to help protect. This can help reduce the necessary inflatable volume of the airbags 70 and can also help provide a desired airbag deployment time without requiring an excessively high-volume inflator.

The airbag 70 are housed/concealed in the floor 58 of the vehicle 20 and are at least one of rolled or folded before being placed behind the floor. The rolled airbags 70 can each be provided in a cover or housing/module 68 that is then placed in the floor 58. The occupant restraint system 10 also includes an inflator 74 positioned in each module 68 for providing inflation fluid to the respective airbag 70. The inflators 74 are operatively connected (e.g., by wires) to an airbag controller 76 (see FIG. 2) that includes or communicates with one or more crash sensors (not shown). The airbag controller 76 is operative to determine the occurrence of a crash event and to actuate the inflators 74 in a known manner to inflate the airbags 70 associated therewith. The inflators 74 can be of any known type, such as stored gas, solid propellant, augmented or hybrid.

The airbags 70 can be constructed of any suitable material, such as nylon (e.g., woven nylon 6-6 yarns), and may be constructed in any suitable manner. For example, the airbags 70 may include one or more pieces or panels of material. If more than one piece or panel is used, the pieces or panels can be interconnected by known means, such as stitching, ultrasonic welding, heat bonding, or adhesives, to form the airbags 70. The airbags 70 can be uncoated, coated with a material, such as a gas impermeable urethane, or laminated with a material, such as a gas impermeable film. The airbags 70 can therefore have a gas-tight or substantially gas-tight construction. Those skilled in the art will appreciate that alternative materials, such as polyester yarn, and alternatives coatings, such as silicone, may also be used to construct the airbags 70.

The occupant restraint system 10 can include multiple airbags 70 provided along the floor 58 at locations associated and aligned with the seats 50a-50c each row 52, 54. In other words, each row 52, 54 in the vehicle 20 can have an individual module 68 (with corresponding airbag 70 and inflator 74) associated and aligned therewith. In each case, each airbag 70 is positioned in front of the associated seats 50a-50c in each row 52, 54 in the direction the occupants 60a-60c in those seats would face (i.e., forward of the front row 52 and forward of the rear row 54 in the seating arrangement of FIG. 2; rearward of the front row and forward of the rear row in the seating arrangement of FIGS. 3-4).

Alternatively, the number of airbags 70 within each module 68 can correspond with the number of seats in the row 52 or 54 associated therewith (e.g., each module can include three airbags associated with the three seats 50a-50c shown in each row). In any case, the airbags 70 extend in the left-to-right or inboard-outboard direction of the vehicle 20 and generally parallel to the width of the seats 50a-50c. Although the airbags 70 within each example construction described herein are identical for each row 52, 54 provided in the vehicle 20, the construction and operation of only the airbag associated with the seats 50a-50c in the front row 52 (FIGS. 3-4) is discussed for brevity.

Since the front row 52 need not face forward and need not be in close proximity to the instrument panel 42 or the area where an instrument panel would normally reside, there can be a large volume of space between the front row 52 and the forward cabin structure presented facing the front row. Because of this, it may not be efficient to deploy airbags from this location due to the large volume that the airbags would need to occupy. This would present problems in sizing the airbag(s) and inflator(s) to occupy that large volume, and could also present problems in deploying the airbag(s) into that large volume in the necessary short time required to protect the occupants in a crash scenario.

Figure 5A:
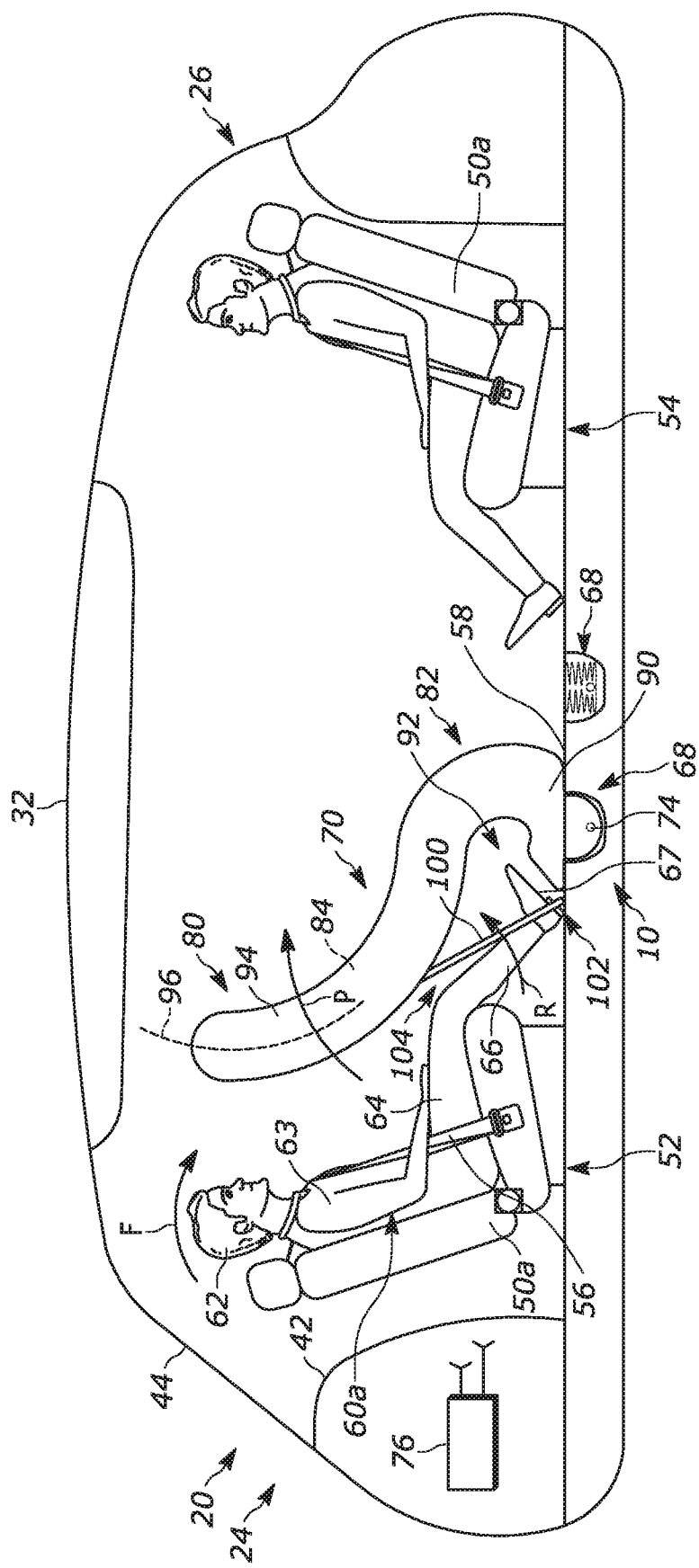
FIG. 5A is a side view of the cabin with an airbag in a deployed condition.
Figure 5B:
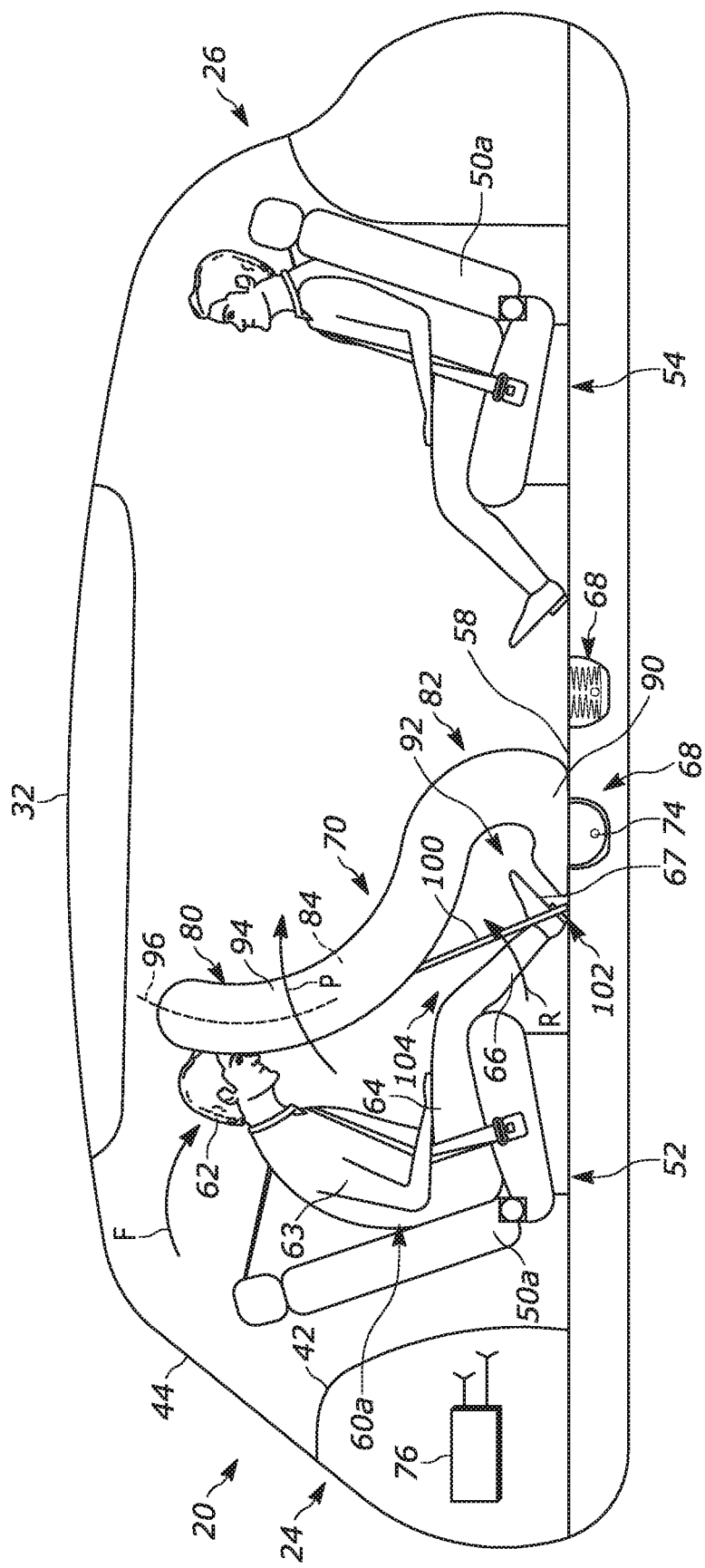
FIG. 5B is a side view of the cabin with an occupant engaging the deployed airbag.

As shown in FIGS. 5A-5B, upon sensing the occurrence of an event for which inflation of the airbags 70 is desired, such as a vehicle collision, the controller 76 provides signals to the inflator 74. Upon receiving the signals from the controller 76, the inflator 74 is actuated and provides inflation fluid to the inflatable volumes of the airbag 70 in a known manner. The inflating airbag 70 exerts a force on the floor 58, which causes the floor to open (e.g., via tear seam or door). This releases the airbag 70 to inflate and deploy from a stored condition behind the floor 58 to a deployed condition extending into the cabin 40 rearward of and aligned with each seat 50a-50c in the front row 52. The airbag 70 while inflated, helps protect the vehicle occupants 60a-60c in the front row 52 by absorbing the impact of the occupants. While the this description is directed to the configuration and deployment of the airbag 70 associated with the front row 52, it will be appreciated that the airbag associated with the rear row 54 has the same or substantially the same configuration and deployment.

Referring to FIGS. 5A-5B, the airbag 70, when deployed, extends from an upper end 80 to a lower end 82 and defines an inflatable volume 84. The lower end 82 is connected to the vehicle floor 58 and fluidly connected to the inflator 74. The upper end 80 is positioned adjacent the occupants 60a-60c in the seats 50a-50c in the front row 52.

The airbag 70 has an elongated configuration (when viewed in profile), including a first airbag portion 90 and a second airbag portion 94 that extends contiguously from the first airbag portion. The first airbag portion 90 extends from the floor 58 and is curved. In one example, the first airbag portion 90 extends out of the floor 58 and away from the occupants 60a-60c, then curves back towards the occupants to form a reverse or backwards c-shape (i.e., the first airbag portion is convex from the perspective of the occupants 60a-60c in the front row 52 and therefore curves away from the occupants). Due to this configuration, the first airbag portion 90 defines or bounds an uninflated volume or pocket 92 outside the inflatable volume 84. The first airbag portion 90 extends to a position aligned with or above the occupants' laps/lower torsos 64. The pocket 92 is positioned adjacent the legs 66 and/or feet 67 of the occupants 60a-60c.

The second airbag portion 94 can be curved (as shown) or straight (not shown) and extends from the first airbag portion 90 towards the occupants 60a-60c and the vehicle roof 32. Consequently, the second airbag portion 94 has a centerline 96 that extends from the first airbag portion 90 in a forward and upward direction (as shown) of the vehicle 20. In one example, the second airbag portion 94 is curved towards the occupants 60a-60c (i.e., the second airbag portion is concave from the perspective of the occupants 60a-60c in the front row 52). In any case, the second airbag portion 94 is pivotable about the first airbag portion 90 in the manner indicated generally by the curved arrow P in FIG. 5B. The second airbag portion 94 extends to a position aligned with or above the occupants' heads 62. The second airbag portion 94 can extend to a position closer to the upper torsos 63 of the occupants 60a-60c than the first airbag portion 90.

One or more tethers 100 extend between the floor 58 and the airbag 70. In one example, the tether 100 includes a first end 102 connected to the floor 58 and a second end 104 connected to the airbag 70 at a location at or above the occupants' lap/lower torso 64. Alternatively, the first end 102 of the tether 100 can be connected to the module 68 and thereby indirectly connected to the floor 58. The tether 100 is made from an inextensible material and helps prevent relative forward-rearward movement between the airbag 70 and the floor 58. The tether 100 can also help limit/prevent relative inboard-outboard movement between the airbag 70 and the floor 58.

When a vehicle crash occurs (see FIGS. 5A-5B), the occupants 60a-60c can move generally in the forward-rearward direction of the vehicle (i.e., along or parallel to the vehicle centerline 22). This occurs when the impact is at the first end 24 or rear end 26 of the vehicle 20 along or substantially along the centerline 22. Because the occupants 60a-60c are belted, a rear crash resulting in rearward occupant movement causes the occupants to bend at the waist and follow an angled or arcuate path toward the second airbag portion 94 of the airbag 70, as indicated generally by the arrow F in FIGS. 5A-5B. Once the moving occupants 60a-60c engage the second airbag portion 94, the airbag 70 is urged to move in the direction F.

The airbag 70, being held in place by the vehicle floor 58 and the tether 100, provides reaction forces that are opposite the impact forces applied to the airbag by the penetrating occupants 60a-60c. More specifically, constraining movement of the lower end 82/first airbag portion 90 via the floor 58 constrains swinging or pivotal movement of the occupant's feet 67 in the manner indicated generally by the curved arrow labeled R in FIGS. 5A-5B. Constraining movement of the first airbag portion 90 via the floor 58 and the tether 100 helps constrain swinging or pivotal movement of the occupant's legs 66 in the manner R. To this end, if the occupants' legs 66 pivot in the manner R into the first airbag portion 90, movement of the first airbag portion away from the floor 58 will be limited/prevented by the connection between the tether 100 and the floor. The floor 58, through the tether 100, thereby helps maintain the first airbag portion 90 in the curved configuration in response to occupant penetration.

Constraining movement of the second airbag portion 94 restricts movement of the occupants' heads 62 and upper torsos 63 along the path F. To this end, the tether 100 holds the bottom of the second airbag portion 94 in place while the inflation fluid pressure within the second airbag portion resists movement of the second airbag portion along the path F. The tether 100 and inflation fluid pressure thereby cooperate to limit/prevent pivotal movement P of the second airbag portion 94 about and relative to the first airbag portion 90 and away from the occupants 60a-60c in response to occupant movement along the path F. For these reasons, the example airbag 70 therefore requires no interaction with forward structure of the vehicle, such as an instrument panel, steering wheel, or seat, to provide a reaction surface for the airbags and desired ride-down characteristics.

From the above, it will be appreciated that the example configurations of FIGS. 1-5B illustrate that the airbags are configured to utilize the vehicle floor as a reaction surface in both the conventional and unconventional seating arrangements. By "reaction surface," it is meant that it is the vehicle floor that supports the airbags against movement in response to impacting occupants. In other words, the airbags attempts to move in a first direction in response to an impacting occupant and the floor applies a reaction force to the airbags in a second, opposite (or substantially opposite) direction to limit/prevent movement of the airbags in the first direction. This allows the airbags to absorb impact forces of the occupants and provide the desired ride-down effect.

Advantageously, the example configurations can require only the vehicle floor to provide the reaction surfaces and can help provide effective occupant protection without requiring any support from structure presented forward of the occupants. This is case regardless of whether the occupants are seated in the conventional or unconventional seating arrangement.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

We claim:

1. A restraint system for helping to protect at least one occupant of a vehicle having a floor and a cabin with at least one seat for receiving each occupant, comprising:
    an airbag extending from a first end mounted in the vehicle floor to a second end, the airbag including a first airbag portion curved away from the at least one occupant and a second airbag portion extending towards the at least one occupant, the airbag having a stored condition and being inflatable to a deployed condition aligned with the at least one occupant; and
    a tether connected to the airbag and the floor for limiting relative forward-rearward movement of the airbag in response to occupant penetration into the airbag.

2. The restraint system recited in claim 1, wherein the second airbag portion is curved.

3. The restraint system recited in claim 1, wherein the second airbag portion extends upwards towards a roof of the vehicle.

4. The restraint system recited in claim 1, wherein the first airbag portion is configured to be connected to the floor and positioned between the floor and the second airbag portion.

5. The restraint system recited in claim 1, wherein the first airbag portion defines an uninflated volume positioned adjacent legs of the at least one occupant.

6. The restraint system recited in claim 1, wherein the first and second airbag portions are contiguous with one another.

7. The restraint system recited in claim 1, wherein the second end is positioned closer to an upper torso of the at least one occupant than the first end when the airbag is in the deployed condition.

8. The restraint system recited in claim 1, wherein the at least one occupant comprises multiple occupants, the airbag extending in a inboard-outboard direction of the vehicle so as to be aligned with each of the occupants.

9. The restraint system recited in claim 1, wherein the first airbag portion is convex relative to the at least one occupant and the second airbag portion is concave relative to the at least one occupant.

10. The restraint system recited in claim 1, wherein the tether is connected to the floor at a location in front of the at least one seat.

11. The restraint system recited in claim 1, wherein the second airbag portion is pivotable relative the first airbag portion about a point positioned below a free end of the second airbag portion.

12. A restraint system for helping to protect at least one occupant of a vehicle having a floor and a cabin with at least one seat for receiving each occupant, comprising:
    an airbag extending from a first end mounted in the vehicle floor to a second end, the airbag including a first airbag portion curved away from the at least one occupant so as to be convex relative to the at least one occupant and a second airbag portion curved towards the at least one occupant so as to be concave relative to the at least one occupant and having a centerline extending towards a roof of the vehicle, the first airbag portion being configured to be connected to the floor and positioned between the floor and the second airbag portion, the airbag having a stored condition and being inflatable to a deployed condition aligned with the at least one occupant; and
    a tether connected to the airbag and the floor for limiting relative forward-rearward movement of the airbag in response to occupant penetration into the airbag.

13. The restraint system recited in claim 12, wherein the first airbag portion defines an uninflated volume positioned adjacent legs of the at least one occupant.

14. The restraint system recited in claim 12, wherein the first and second airbag portions are connected end-to-end with one another.

15. The restraint system recited in claim 12, wherein the second end is positioned closer to an upper torso of the at least one occupant than the first end when the airbag is in the deployed condition.

16. The restraint system recited in claim 12, wherein the at least one occupant comprises multiple occupants, the airbag extending in a inboard-outboard direction of the vehicle so as to be aligned with each of the occupants.

17. The restraint system recited in claim 12, wherein the tether is connected to the floor at a location in front of the at least one seat.

18. The restraint system recited in claim 12, wherein the second airbag portion is pivotable relative the first airbag portion about a point positioned below a free end of the second airbag portion.

* * * * *